United States Patent [19]

Pingel et al.

[11] 4,299,952

[45] Nov. 10, 1981

[54] METHOD FOR RECOVERING SYNTHETIC RESINOUS LATEX SOLIDS

[75] Inventors: Ronald J. Pingel, Midland; Geofrey P. Onifer, Sanford; Thomas L. Spencer, Coleman, all of Mich.

[73] Assignee: The Dow Chemical Company, Midland, Mich.

[21] Appl. No.: 133,385

[22] Filed: Mar. 24, 1980

[51] Int. Cl.³ .............................................. C08F 6/00
[52] U.S. Cl. .................................. 528/500; 526/338; 528/499; 528/502
[58] Field of Search ............................... 528/500, 502

[56] References Cited

U.S. PATENT DOCUMENTS

| | | | |
|---|---|---|---|
| 2,854,426 | 9/1958 | Dasher | 528/502 X |
| 4,110,529 | 8/1978 | Stoy | 528/491 |
| 4,133,947 | 1/1979 | Kalka | 528/502 |

*Primary Examiner*—C. A. Henderson
*Attorney, Agent, or Firm*—R. B. Ingraham

[57] ABSTRACT

Latex is shear coagulated to form a paste, the paste heated and sheared to form a desired crumb; the crumb is mechanically dewatered and ground to a desired particle size. Relatively low energy consumption is a feature of the process.

10 Claims, 3 Drawing Figures

METHOD FOR RECOVERING SYNTHETIC RESINOUS LATEX SOLIDS

BACKGROUND OF THE INVENTION

Synthetic resinous materials are prepared in a variety of manners such as mass polymerization suspension polymerization, solution polymerization and emulsion polymerization. For many resinous materials it is desirable that they be prepared by an emulsion polymerization technique in order that the desired particle size molecular weight or grafting reaction is more readily obtained by the emulsion polymerization route than by solution, suspension or mass polymerization. Latex solids have been recovered most frequently by adding an electrolyte to the latex, usually with heating and agitation to cause the latex particles to agglomerate into macro particles which are readily filtered, washed and dried. Typical processes are discussed in U.S. Pat. Nos. 3,248,455; 3,345,430; and 3,438,923, the teachings of which are herewith incorporated by reference thereto. For some purposes the use of electrolyte in coagulation results in undesired retention of the emulsifier employed in the emulsion polymerization and oftentimes retention of at least some of the electrolyte employed for the coagulation. In order to overcome the problem of electrolyte retention, nitrile polymer latexes have been coagulated by shear coagulation. Shear coagulation is a process wherein a latex is subjected to mechanical shear until at least a major portion of the latex particles have agglomerated and in the event that the system which is subjected to shear has a solids content of about 20 to 30 weight percent, the shear coagulated product is a more or less grainy paste. U.S. Pat. No. 3,821,348 discloses a shear coagulation process wherein the resultant paste of a nitrile polymer latex is extruded and placed in hot water for a period of time and the resultant extrude washed and dried.

It would be desirable if there were available an improved process for the recovery of latex solids.

It would also be desirable if there were available an improved process for the recovery of latex solids which required minimal energy.

It would also be desirable if there were available an improved process for the recovery of latex solids which required minimal quantities of water and steam.

SUMMARY OF THE INVENTION

These benefits and other advantages in accordance with the present invention are achieved in a process for the recovery of synthetic resinous thermoplastic latex solids from a latex, the steps of the method comprising providing a latex of a synthetic resinous thermoplastic polymer, the latex containing from about 10 to about 50 weight percent solids, subjecting the latex to mechanical shear sufficient to transform the latex into a paste-like mass, admixing the paste-like mass with steam under pressure with mechanical shear provided by the admixture of steam with said mass to thereby heat the paste-like mass above the softening point of the polymer and form a plurality of macro particles of which at least 90 weight percent are retained on an 80 mesh U.S. Sieve Size screen and subsequently subjecting said macro particles to mechanical working to expel at least a majority of water associated therewith.

The process of the present invention is operable with any synthetic resinous thermoplastic latex having solids content by weight of from about 10 to about 50 weight percent. Typically, latexes which are useful in the present process include polystyrene latex, polymethyl methacrylate, polybutadiene polyisoprene latexes, polyvinylacetate latexes, polyvinylchloride latexes, various copolymer latexes including styrene and butadiene latexes, vinylchloride vinylacetate copolymers, vinylidene chloride, vinylchloride latexes, polymethylmethacrylate latexes, polymethylacrylate latexes, and the like.

Latexes which particularly benefit from treatment in accordance with the present invention are styrene-acrylonitrile-rubber latexes wherein styrene-acrylonitrile copolymer is grafted to a diene rubber substrate such as polybutadiene. The only component in addition to the latex that is required is process steam. Steam of commercial purity under pressures of from about 25 to about 400 pounds per square inch guage are generally satisfactory.

During the heating of the paste-like mass prepared by shear coagulation, the temperature of the solids should be raised at least to the softening point of the polymer to permit desired agglomeration. Therefore, the steam pressure for a particular latex must be sufficiently high to raise the polymer to its softening point. In the event it is desired to dilute the latex prior to shear coagulation in order to provide a paste of a more flowable consistency, water is employed. Usually it is desirable that such water be deionized in order to minimize possible introduction of materials which might affect the thermal stability of the desired end product.

Further features and advantages of the present invention will become more apparent from the following specification taken in connection with the drawing wherein:

DETAILED DESCRIPTION OF DRAWING

Figure 1:
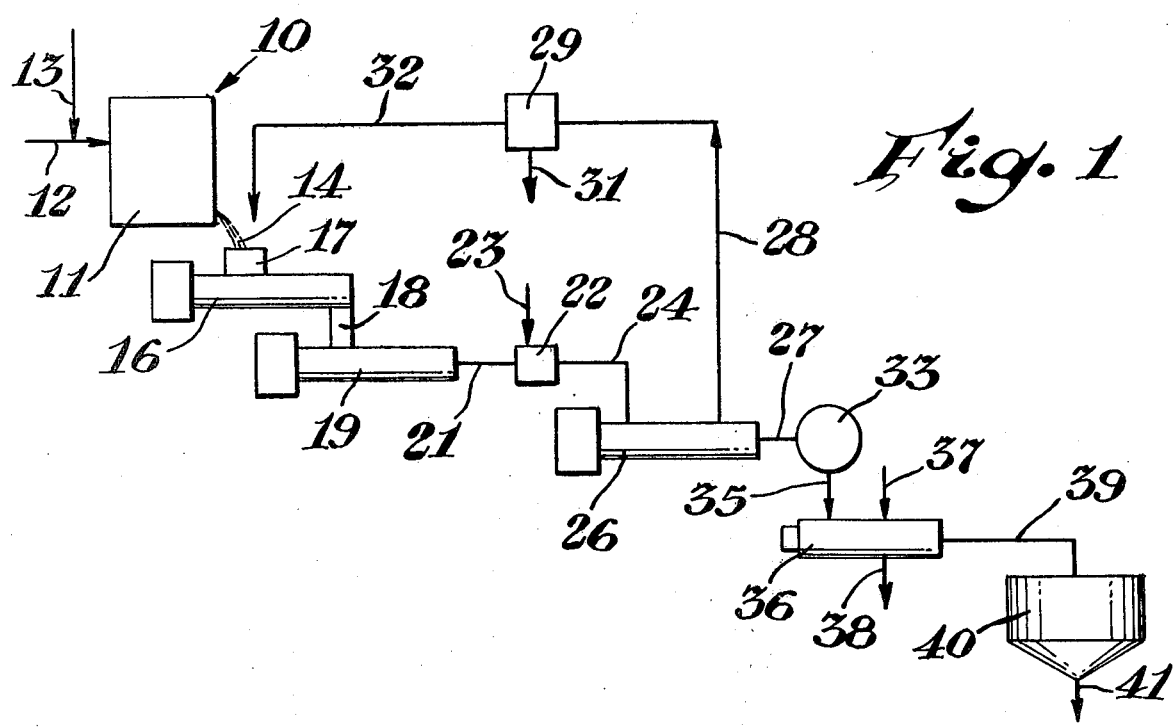
FIG. 1 is a simplified schematic representation of the process in accordance with the present invention.

In FIG. 1 there is schematically depicted an apparatus 10 suitable for the practice of the process of the present invention. The apparatus 10 comprises in cooperative combination a shear coagulator 11. The shear coagulator 11 has in association therewith a latex carrying conduit 12 which discharges a synthetic resinous thermoplastic latex into coagulator 11. The conduit 12 has associated therewith a steam supply conduit 13 attached to supply steam to latex in the conduit 12 and raise the temperature to a desirable coagulating temperature; for example, 40°–90° C. The shear coagulator 12 discharges a steam of paste-like mass 14 to a mixing and forwarding apparatus 16. The mixing and forwarding apparatus 16 beneficially can be a rotary type mixer with blades affixed to a shaft, the blades being inclined at an angle to the shaft to provide a forwarding action. The mixer 16 has an inlet 17 and a discharge 18. The discharge 18 of the mixer 16 is in communication with a pump 19. The pump 19 beneficially is a screw type pump such as is commercially available under the trade name of Moyno. The pump 19 has an inlet in operative communication with the discharge 18, mixing and forwarding device 16, and a discharge conduit 21 in operative communication with a steam mixing and shearing device 22. The mixing and shearing device 22 has a steam inlet 23 and an outlet 24. The mixing and shearing device 22 forms the paste-like mass from the pump 19 into a wet granular mass. The wet granular mass passes through the discharge 24 into a mechanical dewatering apparatus 26 having an inlet communicating with the discharge 24. The mechanical dewatering apparatus 26 has a first or solids discharge 27 and a liquid discharge line 28. The liquid discharge line 28 is in communication with a filter or screen assembly 29. The filter assembly 29 has a liquid discharge 31 and a solids discharge 32. The solids discharge 32 discharges to the inlet 17 of the mixing and forwarding device 16. The solids discharge 27 passes to a grinder 33 which commutes the solid material from the mechanical dewatering device 26. The particulated solids from the grinder 33 are passed through conduit 35 to a cooler such as a rotary cooler 35 having a cooling water inlet 37 and a cooling water discharge 38. Particulate material from the cooler 36 is discharged via line 39 into a storage hopper 40 and subsequently passed from the hopper 40 through line 41 for packaged shipment and final use.

Figure 2:
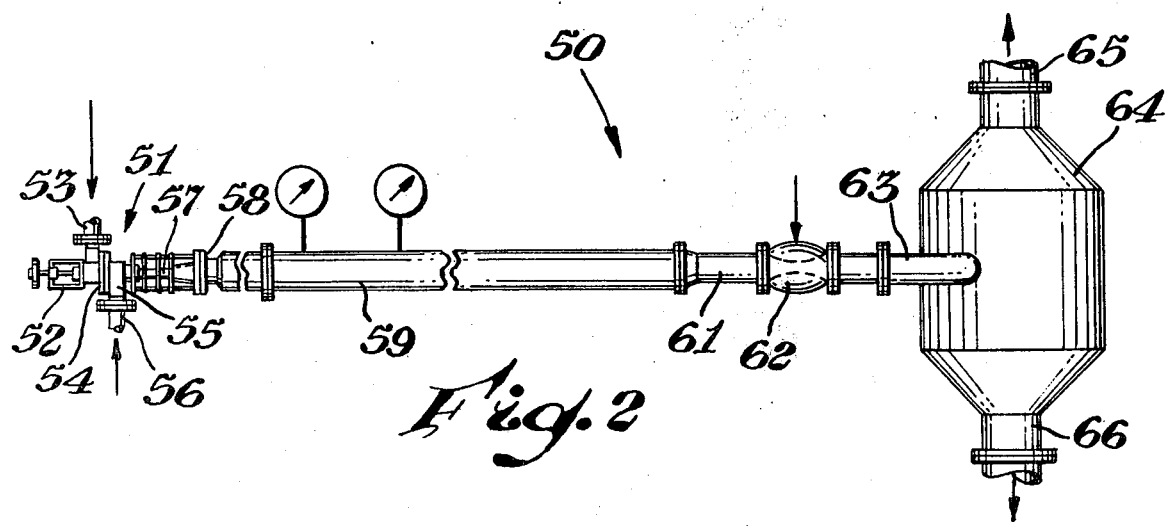
FIG. 2 is a representation of a steam paste mixing device such as is employed in FIG. 1.

In FIG. 2 there is a schematic representation of a steam-paste mixing apparatus generally designated by the reference numeral 50. The apparatus 50 is generally equivalent to the mixer designated by the reference numeral 32 in FIG. 1. The mixer 50 comprises an inlet mixing assembly generally designated by the reference numeral 51 which comprises steam valve 52 having a steam inlet 53 and a discharge region 54. The discharge region 54 of the valve 52 is in communication with a paste inlet mixing and shearing assembly 55 having a paste inlet 56 and a high shear region 57. The high shear region 57 has a discharge end 58 which is in full communication with a pipe section 59. The pipe section 59 remote from the high shear region 57 is connected to a reducer 61. The discharge of the reducer 61 is in communication with a backpressure valve 62. Beneficially the valve 62 is a fluid operated pinch valve. By fluid operated pinch valve is meant a valve that comprises a housing, a flexible tube is disposed within the housing and serves to convey fluids therethrough. Space between the tube and the housing is in communication with a source of a pressurized fluid which can be selectively applied thereto to collapse the flexible tube and thereby close the valve or to remove at least a portion of the pressurized fluid to thereby open the valve. The valve 62 remote from the reducer 61 is in communication with conduit 63. The conduit 63 remote from the valve 62 terminates in a disentrainment chamber 64. The chamber 64 has an overhead vent 65 through which steam may escape and a bottom discharge 66 through which the solid wet particulate product is withdrawn.

Figure 3:
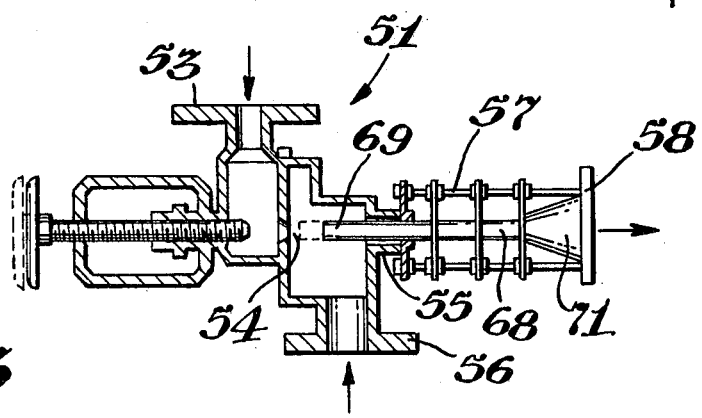
FIG. 3 is a schematic sectional representation of the steam paste mixing inlet portion of the device of FIG. 2.

FIG. 3 is a schematic sectional representation of the steam paste mixing section 51 of FIG. 2. Disposed within the high shear region 57 is a tube 68. The tube 68 has a first inlet end 69 and a second or discharge end 71. The tube 68 is adjustably mounted within the mixing section in such a manner that the location of the inlet end 69 can be axially positioned toward or away from the valve 52 and thereby vary the shearing and agitating effect of the steam on the latex paste-like mass provided from inlet 56.

DETAILED DESCRIPTION OF INVENTION

In the practice of the process in accordance with the present invention with particular reference to the Drawing, latex is passed through conduit 12 where it is heated by steam introduced from conduit 13. The shear coagulator 11 is adjusted until a desired paste-like configuration is obtained. For example, a suitable shear coagulator is a butter churn of the generally horizontal cylindrical drum variety having internal blades which rotate about the axis of the drum, the blades having a clearance from the drum of about one-eighth of an inch. When temperature of the incoming latex and rotational speed of the shear coagulator 11 have been adjusted to provide desired paste-like effluent, the paste-like mixture is passed into inlet 17 of the mixer 16. The mixer 16 provides the dual function of forwarding the paste toward the pump 19 as well as mix into the paste any solids which are returned through line 32. In the event that the paste consistency is thicker than desired, the mixer 16 can be employed to optionally dilute the paste with water to provide a more flowable stream. The pump 19 beneficially forwards the paste through the line 21 into the steam mixing and shearing device 22. Such a mixing and shearing device is schematically depicted in FIGS. 2 and 3. When paste starts to flow, for example, through inlet 56, steam is introduced through the opening 53 and controlled by the valve 52. Pressure within the pipe section 59 is controlled in part by the appropriate opening and closing of the valve 62 and adjustment of the tube 69 until the desired crumb is obtained. The resultant slurry preferably at a temperature below the softening temperature of the latex polymer passes from the mixer 50 through opening 66 into mechanical dewatering device such as device 26. A suitable dewatering device is a so-called expeller or expressing apparatus which basically is a screw extruder having longitudinal slots formed in the barrel thereof of width sufficient to permit water or like liquids to flow therethrough and yet sufficiently narrow to prevent solids from passing through. Roller mills and like expressing apparatus are also suitable and may be used alone or in combination. The solids material discharged from the expeller is ground to a desirable size, collected if necessary by a collector such as collector 36 and stored for future use. For many applications it is not necessary to remove all of the water. Typically the water content of the material emerging from the mechanical dewatering device such as device 26 is about 10 to 20 weight percent. As each latex batch appears to have a personality of its own, it is generally desirable to prepare as large a charge of latex as is conveniently possible in order to avoid individual adjustment of the apparatus for the coagulation of individual batches. Conveniently, a steam mixer such as is depicted in FIG. 2 for a throughput slightly in excess of 2,000 pounds of latex per hour employs as pipe 59 three-inch diameter stainless steel Schedule 40 pipe. A tube, such as tube 69, is about one inch in diameter. The conduit 61 is a stainless steel reducer from three-inch to two-inch pipe. The valve 62 is a nominal two-inch pipe size and the disentrainment chamber 64 is about eighteen inches in diameter, and operated at about atmospheric pressure. A plurality of latexes were prepared. The resultant latex solids containing 41 percent by weight styrene, 20 weight percent acrylonitrile and 39 percent butadiene. The latex particle size was about 1600 angstroms in diameter and the latexes were about 31 weight percent solids.

A range of operating conditions were employed. The range and the average values for about fifty batches of latex are set forth in Table I.

TABLE I

| | OPERATING CONDITIONS | | |
|---|---|---|---|
| PARAMETER | UNITS | MEAN VALUE | RANGE |
| Latex Feed Rate | lb/hr | 2350 | 1200-4400 |
| Coagulation Temp. | °C. | 65 | 93-60 |
| Hydroset Backpressure | psig | 60 | 55-75 |
| Hydroset Temp. | °C. | 119 | 86-148 |
| Expeller Output Pressed Cake | lb/hr | 727 | 250-850 |
| Outlet Moisture | wt % | 19 | 10-20 |

A plurality of latexes were prepared wherein the polymer composition of the latex was 46 weight percent butadiene, 17 percent acrylonitrile and 37 percent styrene. The butadiene latex was prepared and the styrene acrylonitrile grafted thereon to provide latexes having about 37 weight percent solids and a particle size of about 1400 angstroms. The latex was coagulated at 37 percent solids and diluted in the mixing and forwarding apparatus to about 26 to 32 percent solids in order to provide a more flowable paste. The range of operating conditions and the mean values are set forth in Table II.

TABLE II

| | OPERATING CONDITIONS | | |
|---|---|---|---|
| PARAMETER | UNITS | MEAN VALUE | RANGE |
| Latex Feed Rate* | lb/hr | 2210 | 900-3700 |
| Coagulation Temp. | °C. | 46 | 38-66 |
| Hydroset Backpressure | psig | 35 | 10-80 |
| Hydroset Temp. | °C. | 95 | 70-115 |
| Expeller Output Pressed Cake | lb/hr | 500 | 280-580 |
| Outlet Moisture | wt % | 11.8% | 9-14 |

*Coagulated paste diluted to approximately 26 to 32% solids by weight prior to mixing and hydrosetting.

In a manner similar to the foregoing, other synthetic resinous thermoplastic latexes are readily coagulated and dewatered.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. A process for the recovery of synthetic resinous thermoplastic latex solids from a latex, the steps of the method comprising providing a latex of a synthetic resinous thermoplastic polymer, the latex containing from about 10 to about 50 weight percent solids, subjecting the latex to mechanical shear sufficient to transform the latex into a paste-like mass, admixing the paste-like mass with steam under a pressure of from about 25 to 400 pounds per square inch with mechanical shear provided by the admixture of steam with said mass to thereby heat the paste-like mass above the softening point of the polymer and form a plurality of macro particles of which at least 90 weight percent are retained on an 80 mesh U.S. Sieve size screen and subsequently subjecting said macro particles to mechanical working to expel at least a majority of water associated therewith.

2. The method of claim 1 wherein the latex has polymerized therein styrene, acrylonitrile and rubber.

3. The method of claim 1 wherein the plurality of macro particles are passed through a fluid operated pinch valve prior to mechanical working.

4. A process for the recovery of synthetic resinous thermoplastic latex solids from a latex, the steps of the method comprising providing a latex of a synthetic resinous thermoplastic polymer, the latex containing from about 10 to about 50 weight percent solids, subjecting the latex at a temperature of from about 40° to 90° C. to mechanical shear sufficient to transform the latex into a paste-like mass, admixing the paste-like mass with steam under a pressure of from about 25 to 400 pounds per square inch with mechanical shear provided by the admixture of steam with said mass to thereby heat the paste-like mass above the softening point of the polymer and form a plurality of macro particles of which at least 90 weight percent are retained on an 80 mesh U.S. Sieve size screen and subsequently subjecting said macro particles to mechanical working to expel at least a majority of water associated therewith.

5. The method of claim 4 wherein the latex has polymerized therein styrene, acrylonitrile and rubber.

6. The method of claim 4 wherein the plurality of macro particles are passed through a fluid operated pinch valve prior to mechanical working.

7. A process for the recovery of synthetic resinous thermoplastic latex solids from a latex which is a result of the polymerization of styrene and acrylonitrile in the presence of rubber, the steps of the method comprising providing a latex containing from about 10 to about 50 weight percent solids, subjecting the latex to mechanical shear at a temperature of from about 40° to 90° C., the mechanical shear being provided by a butter churn, the mechanical shear being sufficient to transform the latex into a paste-like mass, admixing the paste-like mass with steam under a pressure of from about 25 to 400 pounds per square inch with additional mechanical shear provided by the admixture of steam with said mass to thereby heat the paste-like mass above the softening point of the styrene acrylonitrile rubber polymer and form a plurality of macro particles of which at least 90 weight percent are retained on an 80 mesh U.S. Sieve size screen, passing the macro particles through a fluid operated pinch valve and subsequently subjecting said macro particles to mechanical working to expel at least a majority of water associated therewith.

8. A process for the recovery of synthetic resinous thermoplastic latex solids from a latex, the steps of the method comprising providing a latex of a synthetic resinous thermoplastic polymer, the latex containing from about 10 to about 50 weight percent solids, subjecting the latex at a temperature of from about 40° to 90° C. to mechanical shear in a butter churn sufficient to transform the latex into a paste-like mass, admixing the paste-like mass with a steam under a pressure of from about 25 to 400 pounds per square inch with mechanical shear provided by the admixture of steam with said mass to thereby heat the paste-like mass above the softening point of the polymer and form a plurality of macro particles of which at least 90 weight percent are retained on an 80 mesh U.S. Sieve size screen and subsequently subjecting said macro particles to mechanical working to expel at least a majority of water associated therewith.

9. The method of claim 8 wherein the latex has polymerized therein styrene, acrylonitrile and rubber.

10. The method of claim 8 wherein the plurality of macro particles are passed through a fluid operated pinch valve prior to mechanical working.

* * * * *